US011915673B1

(12) United States Patent
Rayfield

(10) Patent No.: US 11,915,673 B1
(45) Date of Patent: Feb. 27, 2024

(54) RESONANCE ENHANCING DEVICE FOR TREMOLO STYLED ELECTRIC GUITARS

(71) Applicant: Dennis Scott Rayfield, Plano, TX (US)

(72) Inventor: Dennis Scott Rayfield, Plano, TX (US)

( * ) Notice: Subject to any disclaimer, the term of this patent is extended or adjusted under 35 U.S.C. 154(b) by 0 days.

(21) Appl. No.: 17/583,153

(22) Filed: Jan. 24, 2022

Related U.S. Application Data

(60) Provisional application No. 63/140,671, filed on Jan. 22, 2021.

(51) Int. Cl.

| | |
|---|---|
| ***G10D 13/02*** | (2020.01) |
| ***G10D 1/08*** | (2006.01) |
| ***G10D 3/02*** | (2006.01) |
| ***G10D 3/153*** | (2020.01) |

(52) U.S. Cl.
CPC ............... *G10D 3/02* (2013.01); *G10D 1/085* (2013.01); *G10D 3/153* (2020.02)

(58) Field of Classification Search
CPC .......... G10D 3/02; G10D 1/085; G10D 3/153; G10D 3/00
See application file for complete search history.

(56) References Cited

U.S. PATENT DOCUMENTS 10,909,955 B2 * 2/2021 Fortoloczki ............ G10D 3/153

* cited by examiner

*Primary Examiner* — Kimberly R Lockett
(74) *Attorney, Agent, or Firm* — Jeffrey Roddy

(57) ABSTRACT

A tremolo block suitable for installation into in a Fender Stratocaster® that includes a raised ridge across the width of the tremolo block approximately halfway down from the top wherein the ridge abuts the body side of the tremolo cavity. It is intended that the ridge will be located at the spot where it presses most firmly against the wood of the guitar body while still as close to neutral or standard location as possible so that the player feels comfortable with the guitar because the guitar feels just as familiar as prior to the installation.

3 Claims, 3 Drawing Sheets

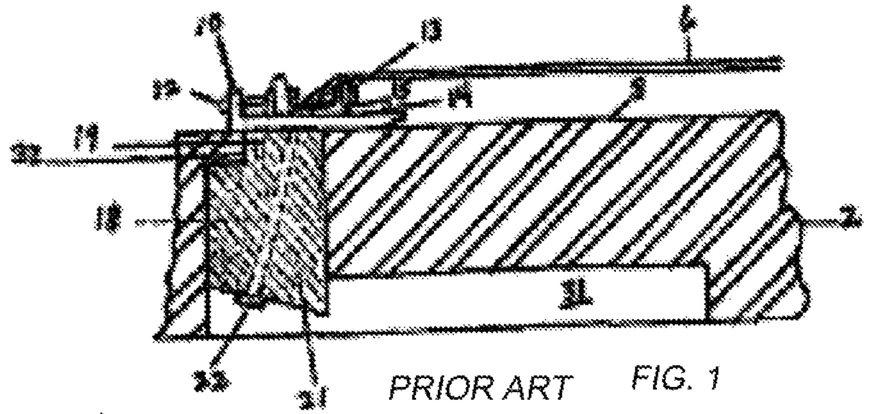
PRIOR ART FIG. 1
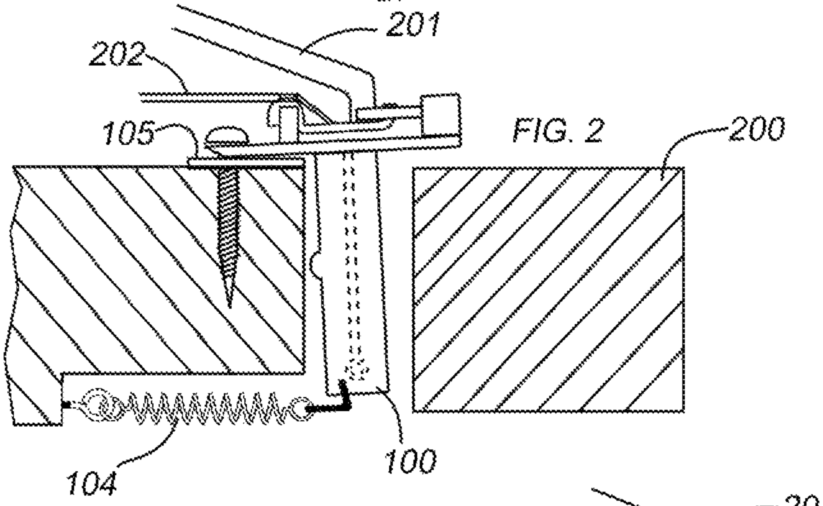
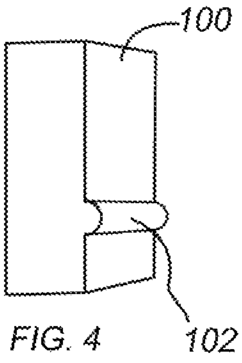
FIG. 4
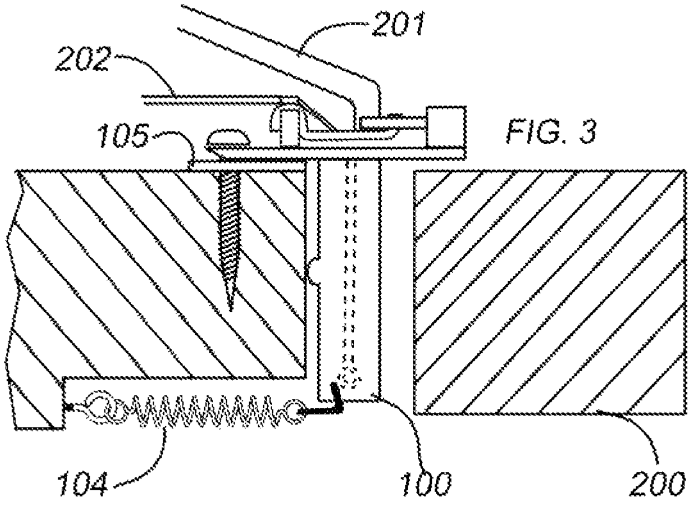
FIG. 5
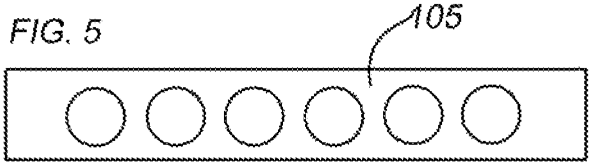

FIG. 6
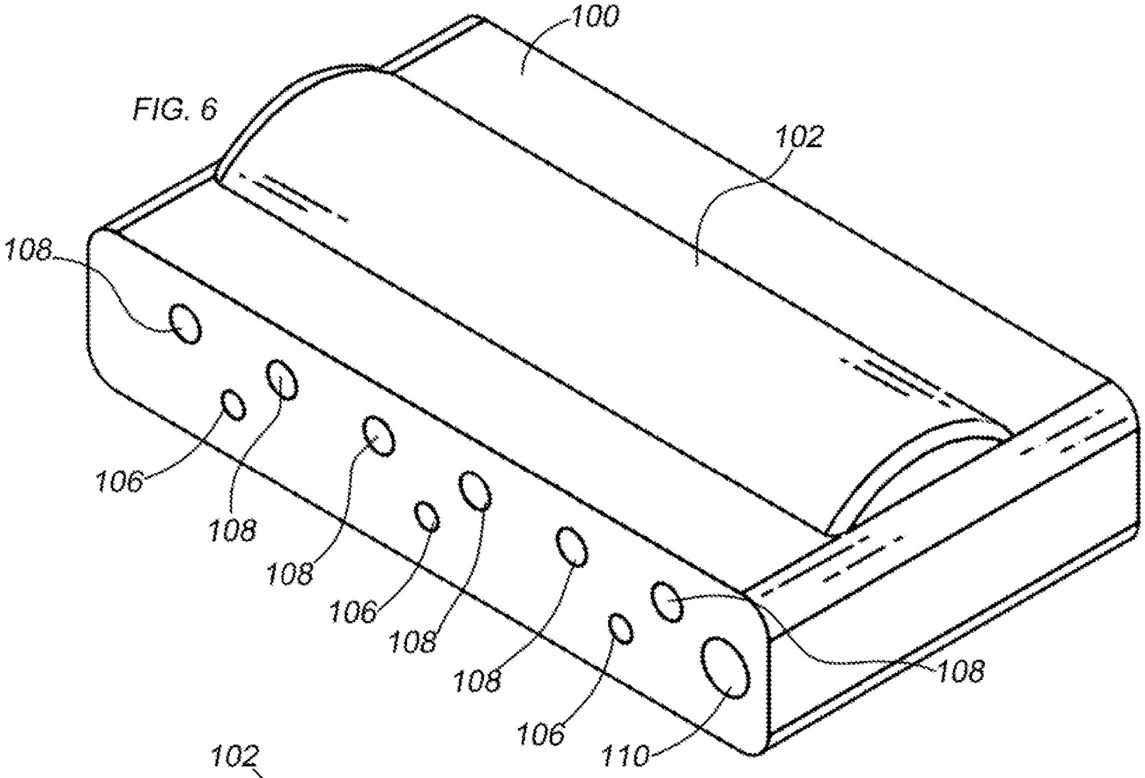
FIG. 7
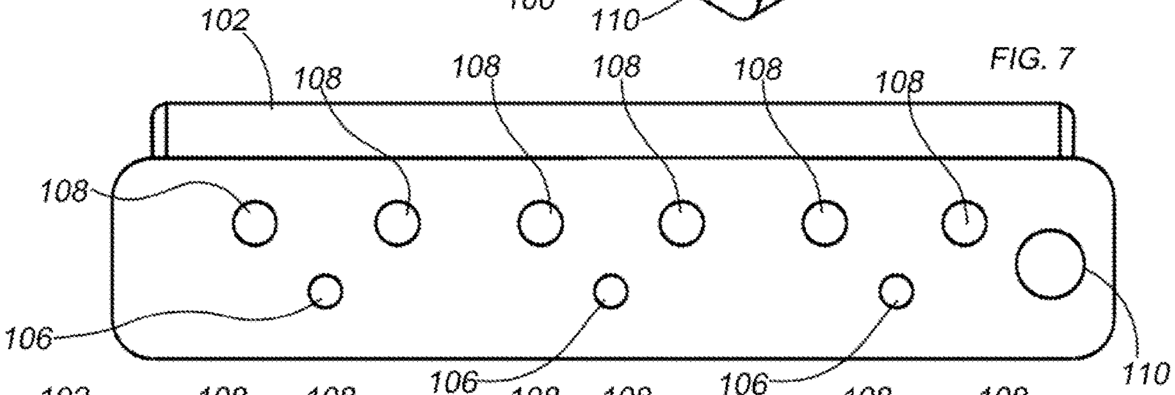
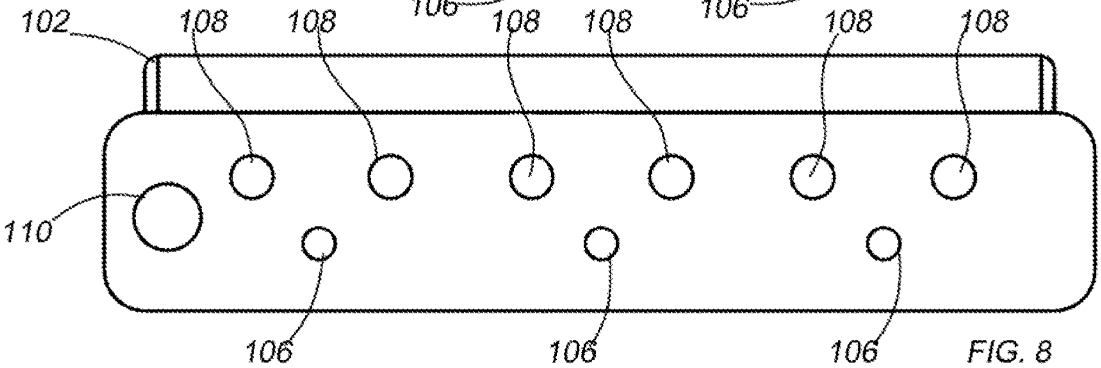
FIG. 8

RESONANCE ENHANCING DEVICE FOR TREMOLO STYLED ELECTRIC GUITARS

BACKGROUND

Field of the Invention

The invention relates generally to resonance enhancing device for tremolo styled electric guitars.

Currently, there are a number of proposed variations on the standard Fender Stratocaster® style tremolo system each offering varied improvements. As far as our research can determine, there is no product that offers to produce the benefits and the effects associated with the aforementioned variations in a simple, straightforward manner without requiring modifications to the guitar itself. While some might choose to make modifications to the guitar body itself requiring a complete retooling in order to bring about what would be considered a fairly drastic and potentially undesirable alteration of the entire guitar or at least the guitar body itself, various implementations described herein are easily installed and uninstalled so that the guitar can revert back to it's original iteration without evidence of alteration or modification.

SUMMARY OF THE INVENTION

One may fix in place on a guitar with a floating tremolo, a wooden block between the tremolo block and the body to fix in place the tremolo thus stabilizing it, which has the effect of holding tune more easily than before. The modification creates additional desirable resonance. The trouble with the foregoing approach is that such a block must be fixed to the body which can be irreversible or at least, difficult to reverse. While this method may add to the resonance of the electric guitar and may enhance resonance, it may not be reversible and if so, will require a significant amount of trouble and effort to reverse. In such cases, the body of the guitar may be permanently altered which can harm the appearance and negatively effect its resale value. Yet the need and/or desire persists for a way to enhance and add resonance to the overall sound and tone of an electric guitar. For most guitarists, a lively, acoustically resonant response from an electric guitar conveys quality wood and components and thus, is received as musically pleasing, even inspiring. It would be desirable to have a device that can be engaged or disengaged easily and inexpensively and which offers the option of an enhancement of or alternative of tone in the electric guitar. Various implementations according to the present invention offer more of an acoustically natural and resonant tone which puts to full use the acoustic properties of the wood used to make the electric guitar itself without requiring alteration of the guitar other than the insertion of a special tremolo block in place of the original tremolo block. Furthermore, it would also be desirable to have a device that helps stabilize the tuning of the guitar simultaneously. Still further, it would be desirable to have a device that performs these functions while leaving the guitar essentially unchanged. The disclosed device and associated methods of installation advantageously addresses the issues above: it helps stabilize the tuning of an electric guitar while exploiting the acoustic and resonant qualities of the wood used for the body of the electric guitar, thereby producing a more acoustically dynamic and musically pleasing electric guitar.

A conventional block will have six pre-molded or pre-drilled holes for strings and three pre-molded threaded holes for three tremolo block screws. Due to the placement of the holes that are pre-molded or drilled for the tremolo springs to attach it, the conventional block is not reversible. In other words, one cannot simply turn it around in reverse fashion. To do this the springs would have to be redesigned and re-machined. This idea complicates the entire process in the attempt to simplify it. It isn't practical and does precisely what isn't desired, namely, requiring complicated and/or costly modifications to the guitar. A standard Fender Stratocaster type tremolo block is modified by molding a raised ridge (102) across the width approximately halfway down from top to bottom. In some implementations, the ridge is approximately ¼ inch wide and protrudes ⅛ inch to 3/16 inch from the block body. In other implementations, the ridge may be approximately ¾-⅞ inch wide on a 1.6 inch wide body and approximately 3 inches long, hence spanning the length of the block body. This protrusion is on the neck side of the block so that it abuts the body side of the tremolo cavity. The foregoing ridge (102) of the tremolo block is a unique modification that performs multiple desirable functions. What is needed to accomplish what we are interested in accomplishing is to mold or apply a protruding ridge across the width of the tremolo block in such a location that it will contact and maintain contact with the body at all times unless the tremolo is depressed which lowers the tone of the strings while moving the tremolo block away from the body temporarily while the tremolo is engaged. Once use of the tremolo effect has ended, the block is pulled closer to the body by the tremolo springs until the tremolo block again contacts the body via the protruding ridge that runs the width of the body of the tremolo block. At this point, the increased resonance effect desired is again activated.

The tremolo block according to the present invention may also include moldings, castings or applications comprised of different materials in order to produce different acoustic resonant qualities. Currently there are tremolo blocks made of brass, steel, aluminum, pot metal, and more. Different combinations of materials comprising the metal block and wood body relationship offer more variations in character and quality of the signal/tone produced by the instrument. In a guitar body, different woods with different resonant qualities will produce different tones and timbres. Such variation will become much more pronounced and influential when the wood is directly amplifying the guitar signal as it is transmitted from the strings and through the tremolo block.

In addition, the raised ridge which is the featured modification could be squarely shaped rather than roundly shaped. However, in order for this configuration to work maximally there would have to be the greatest precision and exactness of manufacturing tolerances allowing the flat surface of the raised ridge to abut squarely and uniformly up against the wooden body. The rounded ridge demands less precision and is more forgiving in this regard which is why it is the preferred version and the one employed in this design and method.

In order to compensate for a lack of precision in manufacturing standards of each guitar body and/or for different measurements and dimensions among manufacturers and guitar makers a simple shim can be included or sold separately. This shim will be made of a highly resonant substance as well, be it metal, wood, carbon fiber or other composite substance. The role of the shim will be to slightly elevate the front end of the tremolo plate of the guitar which will then slightly tilt the tremolo block in order to move the tremolo block forward in the guitar cavity toward the guitar body until the rounded (or squared) ridge contacts the body thus accomplishing the overall objective which is full direct contact of the tremolo block with the guitar body. The shim would have six holes or six slots matching the six holes of the tremolo plate and would slide harmlessly and seamlessly under the tremolo plate of the guitar thus resting between the guitar body and the tremolo plate. The shim would only be necessary in those cases where the block does not quite contact the guitar body but would alleviate that problem if and when it arises.

The disclosed device is unique when compared with other known devices and solutions because it provides the potential for making substantial improvements in the overall acoustic qualities and tones of the electric guitar which will make it more musically pleasing played acoustically or electrically while opening a new area of options and variations in acoustic tone qualities through the use of different types of tonewoods in the construction of the guitar as well as different types of metals and/or materials in the molding of the tremolo block which is the transfer medium between the guitar strings and the guitar body in this case. This is done through a deliberate and specific modification in the molding of the tremolo block only. No modification is required to any other part or aspect of the electric guitar making this improvement completely reversible if and when this month modification is no longer desired. This modification is retroactive and should work perfectly for all Fender Stratocaster and Stratocaster styled guitars past, present, and future given no radical departures in the construction and layout of the tremolo system, or the tremolo cavity of the guitar body. The same applies to other tremolo styled electric guitars. This is an inexpensive, simple, easily installed and implemented improvement which is easily reversed and requires no adaptations or modifications of the guitar other than that described above. This item and it's application are unique in that it offers substantial and highly desirable improvements in the sound of an electric guitar easily and inexpensively by simply exchanging one part for another. With the resulting emphasis and amplification of the value and quality of the wood used to build the electric guitar body, the electric guitar playing experience becomes more satisfying as well as inspiring when the guitar is both amplified and un-amplified.

The disclosed device is unique in that it is structurally different from other known devices or solutions attempting to add stability to the tuning of a tremolo style electric guitar by also offering substantial improvement as well as new-found options in guitar tone and timbre. More specifically, the device is unique due to the presence of a simple variation in the design and molding of the tremolo block. In spite of this variation the tremolo block is still easily installed and/or removed as desired. Other methods may address various different aspects of the tremolo system, none that we can see address specifically the alteration and/or improvement in acoustic properties and enhancement of tone by means of such a simple, easy, non-invasive and completely reversible product and process and at such an affordable price point. Furthermore, the process associated with the aforementioned device is likewise unique in that the fixing of the tremolo block against the wooden body of the guitar aids significantly in the stabilization of the guitars tuning.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Resonance enhancing device for tremolo styled electric guitars. may, however, be embodied in many different forms and should not be construed as being limited to the embodiments set forth herein; rather, these embodiments are provided by way of illustration only and so that this disclosure will be thorough, complete and fully convey understanding to those skilled in the art.

BRIEF DESCRIPTION OF THE DRAWINGS

FIG. 1 shows an example of prior art for comparison purposes;

FIG. 2 in a partial sectional view, shows an example tremolo block ridge according to the present invention, in a non-contacting position with reference to a guitar body and thereby rendered incapable of transmitting vibration of guitar strings to and thru the wood of guitar body;

FIG. 3 in a partial sectional view, shows an example tremolo block ridge according to the present invention, contacting body of guitar thereby able to transmit the vibration of guitar strings to and thru the wood of guitar body;

FIG. 4 in a perspective view shows an example implementation of a tremolo block (100) according to the present invention with a transverse ridge (102);

FIG. 5 is a top plan view of an example implementation of a shim (105) according to the present invention;

FIG. 6 is a perspective view of an example tremalo block according to the present invention;

FIG. 7 is a front side view thereof;

FIG. 8 is a back side view thereof;

NUMBERING OF THE REFERENCED ELEMENTS

Figure 9:
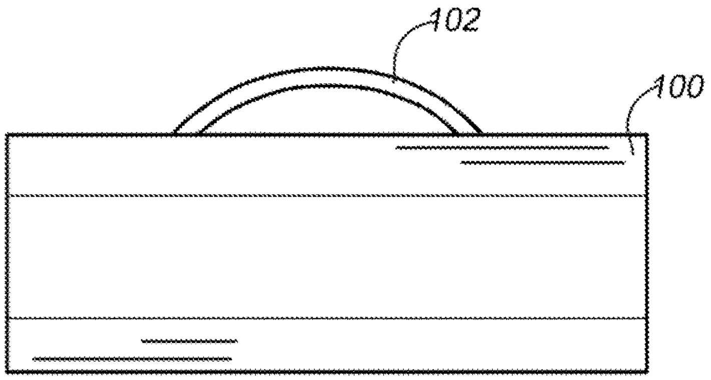
FIG. 9 is an end view thereof, with the opposite end being a mirror view thereof.

100 Tremolo Block
102 Ridge
104 Spring
105 Spacer/shim
106 screw apertures
108 string apertures
110 tremolo arm aperture
200 Guitar Body
201 Tremolo Arm
202 Strings

DETAILED DESCRIPTION

Example implementations according to the present invention is directed to resonance enhancing device for tremolo styled electric guitars. In its most complete form, the device is made up of the following components: A tremolo block (100) suitable for installation into in a Fender Stratocaster® that includes a raised ridge (102) across the width of the tremolo block approximately halfway down from the top. In some implementations, this ridge is approximately ¼ inch wide and protrudes ⅛ inch to 3/16 inch out from the tremolo block body. In other implementations, the ridge may be ¾-⅞ inch wide, approximately 3 inches in length, protrudes 5/32 from the block at its peak and runs substantially the length of the tremolo block. The ridge/protrusion is on the neck side of the block so that it abuts the body side of the tremolo cavity. Minor variations in the measurements will be made as indicated in order to assure more thorough and substantial contact between the tremolo block and the body of the particular guitar. For instance, Fender guitars will have one set of dimensions, Paul Reed Smith guitars will have another set of dimensions, G & L will as well . . . and so on.

In all of the foregoing fitments, the tremolo block according to the present invention will rest against the guitar body and will remain fixed in this position unless or until the guitarist utilizes the tremolo arm (201) which, when pressed down, will release the block (100) from it's position against the body by stretching the springs of the tremolo unit. Once the tremolo unit is released the tremolo block will resume its designed and intended position resting against the body due to the design of the spring tension (104) pulling it back in place. No additional parts or modifications to the guitar body (200) are required. It is conceivable that some implementations according to the present invention may be produced by a modification to the standard Fender tremolo block or a similar type tremolo block by the affixment or molding thereon of an applied ridge object. In any case, ridge (104) faces the body (200) of the guitar on the neck side. Also, already positioned on this side are the three pre-drilled and or molded holes for the tremolo springs to attach as well.

FIG. 1 shows a prior art tremolo block for reference purposes.

FIG. 2 depicts an example tremolo block (100) in an engaged state by simply using the tremolo unit as usual which is to push down on the tremolo arm (201) thus lowering the pitch of the note. The tremolo block does not interfere with typical use of the tremolo unit but does prohibit pulling up on the tremolo bar which produces the effect of raising the pitch of the note rather than lowering the pitch. This use of the tremolo does occur in limited instances with some guitarists although it is the exception rather than the rule.

FIG. 3 shows a tremolo block (100) with a ridge (104) adapted for fitment inside a Fender Stratocaster® and similar tremolo styled guitars in position to bring about the desired effect. As the tremolo block is disengaged as is the case most of the time, the ridge (104) is firmly pressed against the body (200) of the guitar by the tension of the vibrato springs. In this position, the vibration of the strings is transferred to and through the wooden body which acts as an amplifying medium resulting in increased volume and altered and/or enhanced overall tone emanating from the guitar. This produces a different and more complex tone acoustically as well as electrically. This is the desired effect of the device. If once installed, the ridge of the tremolo block does not contact the guitar body, it may be necessary to install spacer/shim (105) under the bridge so that the bridge is moved in a direction sufficient to cause contact between the ridge (104) and (200) body when the tremolo bar is in a resting/disengaged state.

FIG. 4 in a perspective view depicts an example tremolo block (100) according to the present invention. In this depiction, transverse ridge (104) runs across the width of the body and is located approximately ¾ of the way down from the top. In most instances the ridge will be closer to halfway down on the tremolo block. Ideally the ridge will be located at the spot where it presses most firmly against the wood of the guitar body (200) while still as close to neutral or standard location as possible so that the player feels comfortable with the guitar because the guitar feels just as familiar as prior to the installation.

In the event that the tremolo block does not fully contact the body of the guitar inside the tremolo cavity, a shim may be inserted under the front end of the tremolo plate where six screws fix it firmly to the body of the guitar. This would be necessary only in those instances where manufacturing specs are not precise enough or some unforeseen circumstance or exception comes about that prevents the newly styled tremolo block from making its' intended firm contact with the body for the purpose of transferring the vibrations of the guitar strings to and thru the wood of the guitar body. This shim would be manufactured of metal, wood, carbon fiber, or other highly resonant substance in order to facilitate the intended function of the raised ridge on the tremolo block as manufactured. The shim features six holes where the screws that fix the tremolo plate to the body may pass through.

Figure 10:
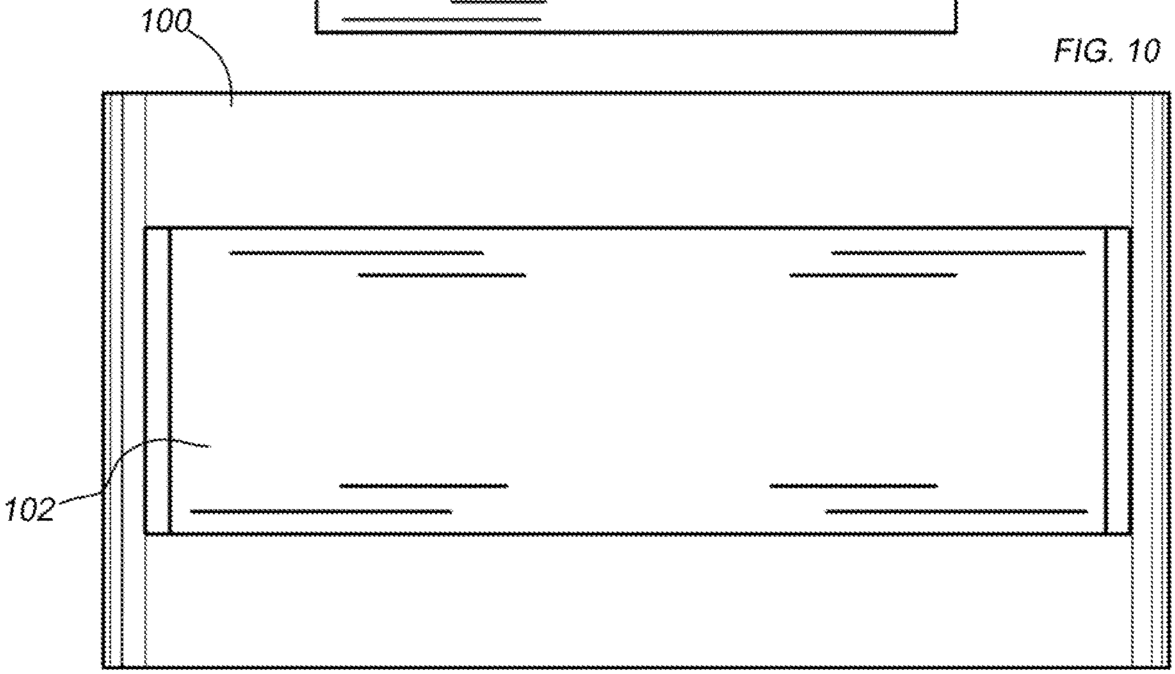
FIG. 10 is a top side view.
Figure 11:
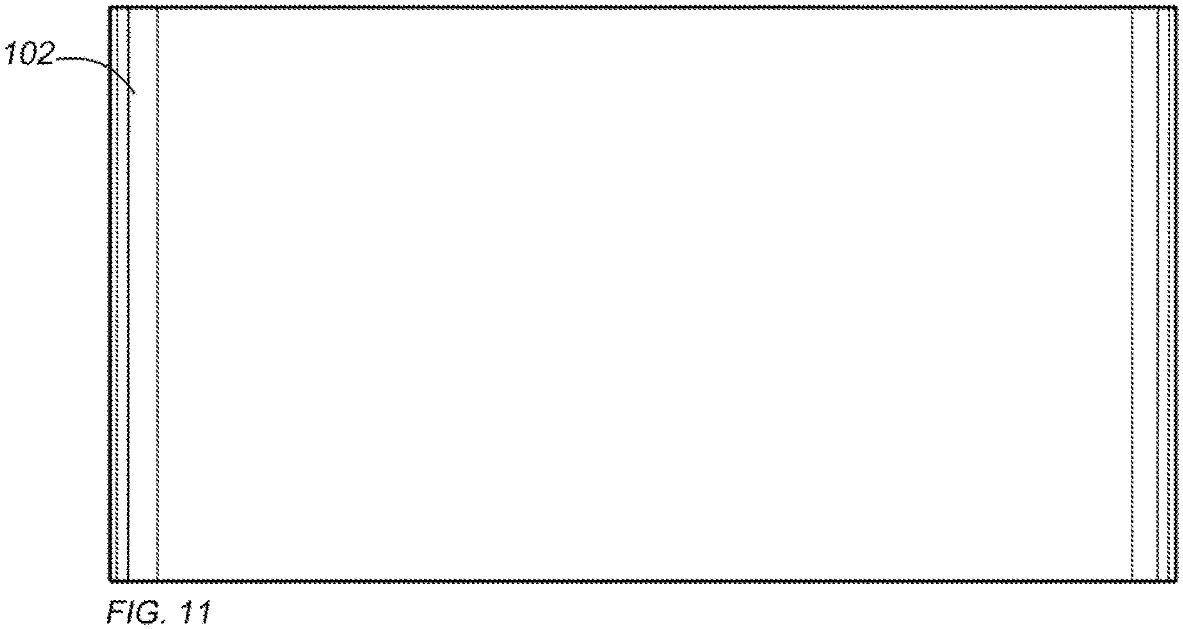
FIG. 11 is a bottom side view thereof.

FIGS. 6-11 show in various views another example tremolo block in accordance with the present invention. In this case, the width of ridge (102) is approximately 5/32 at its peak and approximately ½ the width of the block which is approximately 1.5 inches wide and approximately 3 inches long. Of course, the foregoing are merely exemplary measurements and may vary slightly depending on the particular guitar body the tremolo in to be installed in. Body (100) may be comprised of a single solid material such as brass, or, the body may be a different material than the ridge.

Different features, variations and multiple different implementations have been shown and described with various details. What has been described in this application at times in terms of specific implementations is done for illustrative purposes only and without the intent to limit or suggest that what has been conceived is only one particular embodiment or specific implementations. It is to be understood that this disclosure is not limited to any single specific implementations or enumerated variations. Many modifications, variations and other implementations will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A resonance enhancing device for tremolo styled electric guitars comprising:

a resonant body substantially cuboid in shape, the body includes at least a front face, a back face, a left face and right side face, a width and height, the width being longer than the height, a ridge parallel to the front and back face and running substantially the width of the resonant body, the ridge including a longitudinal curved profile;

the resonant body including a plurality of string holes and a plurality of apertures adapted to receive a fastener.

2. The device according to claim 1 including an aperture adapted to receive a portion of a tremolo arm.

3. The device according to claim 1, the ridge attachable to the resonant body.

* * * * *